US012157300B2

(12) United States Patent
Tsuji

(10) Patent No.: US 12,157,300 B2
(45) Date of Patent: Dec. 3, 2024

(54) PRINTING APPARATUS

(71) Applicant: BROTHER KOGYO KABUSHIKI KAISHA, Nagoya (JP)

(72) Inventor: Takuya Tsuji, Chiryu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 39 days.

(21) Appl. No.: 17/930,115

(22) Filed: Sep. 7, 2022

(65) Prior Publication Data

US 2023/0095871 A1 Mar. 30, 2023

(30) Foreign Application Priority Data

Sep. 30, 2021 (JP) ................................ 2021-160229

(51) Int. Cl.
*B41J 11/00* (2006.01)
*B41J 11/66* (2006.01)
*B41J 29/393* (2006.01)

(52) U.S. Cl.
CPC ........... *B41J 11/663* (2013.01); *B41J 29/393* (2013.01)

(58) Field of Classification Search
CPC . B41J 11/00; B41J 11/663; B41J 11/70; B41J 29/00; B41J 29/38; B41J 29/393
USPC ........................................................ 270/5.02
See application file for complete search history.

(56) References Cited

U.S. PATENT DOCUMENTS 10,500,750 B2 * 12/2019 Fujita ....................... B26D 5/26
10,549,559 B2 * 2/2020 Mizutani ................ B41J 11/663
11,014,367 B2 * 5/2021 Fukasawa ................ B41J 11/70
11,376,875 B2 * 7/2022 Kuronuma ............. B41J 11/663
11,485,152 B2 * 11/2022 Takahashi .............. B41J 13/106
11,731,439 B2 * 8/2023 Fukasawa ................ B41J 29/13 347/104
2021/0122174 A1 * 4/2021 Tanaka .................. B41J 2/1752

FOREIGN PATENT DOCUMENTS

JP 9-193084 A 7/1997
JP 2020-011393 A 1/2020
WO WO-2020194874 A1 * 10/2020 .............. B41J 11/70

OTHER PUBLICATIONS

Espacenet machine translation of WO2020194874A1; https://translationportal.epo.org/emtp/translate/?ACTION=description-retrieval&COUNTRY=WO&ENGINE=google&FORMAT=docdb&KIND=A1&LOCALE=en_EP&NUMBER=2020194874&OPS=ops.epo.org/3.2&SRCLANG=ja&TRGLANG=en (Year: 2020).*

* cited by examiner

*Primary Examiner* — Leslie A Nicholson, III
(74) *Attorney, Agent, or Firm* — Merchant & Gould P.C.

(57) ABSTRACT

A printing apparatus, having a conveyer configured to convey a recording medium along a first conveying direction, an image recorder to record an image on the recording medium supported by a supporting portion, a liquid storage arranged on an outside of the supporting portion in a direction intersecting with the first conveying direction, a cutter assembly to cut the recording medium, and a controller, is provided. The controller is configured to move the cutter assembly to an outside of the supporting portion in a scanning direction, which intersects with the first conveying direction, to cut the recording medium; and control the cutter assembly to stand by at a standby position located on a side of the supporting portion opposite to the side, on which the liquid storage is arranged, on the other outside of the supporting portion in the scanning direction.

13 Claims, 8 Drawing Sheets

PRINTING APPARATUS

REFERENCE TO RELATED APPLICATIONS

This application claims priority from Japanese Patent Application No. 2021-160229, filed on Sep. 30, 2021. The entire content of the priority application is incorporated herein by reference.

BACKGROUND ART

A printing apparatus, which may print an image on a printing medium and has a cutter assembly, is known. The printing apparatus may operate the cutter assembly to cut the printing medium after printing the image. The cutter assembly may be attached to a carriage, on which an ink tank is mounted.

DESCRIPTION

When the cutter assembly and the ink tank are arranged on a same side of the printing apparatus, the center of gravity of the printing apparatus may be offset to one side. Therefore, it may be difficult for a user to pick up and hold the printing apparatus stably, and there may be a risk that the user drops the printing apparatus.

The present disclosure is advantageous in that a printing apparatus, in which the center of gravity is located toward a center, and which may be easier to hold, is provided.

Figure 1:
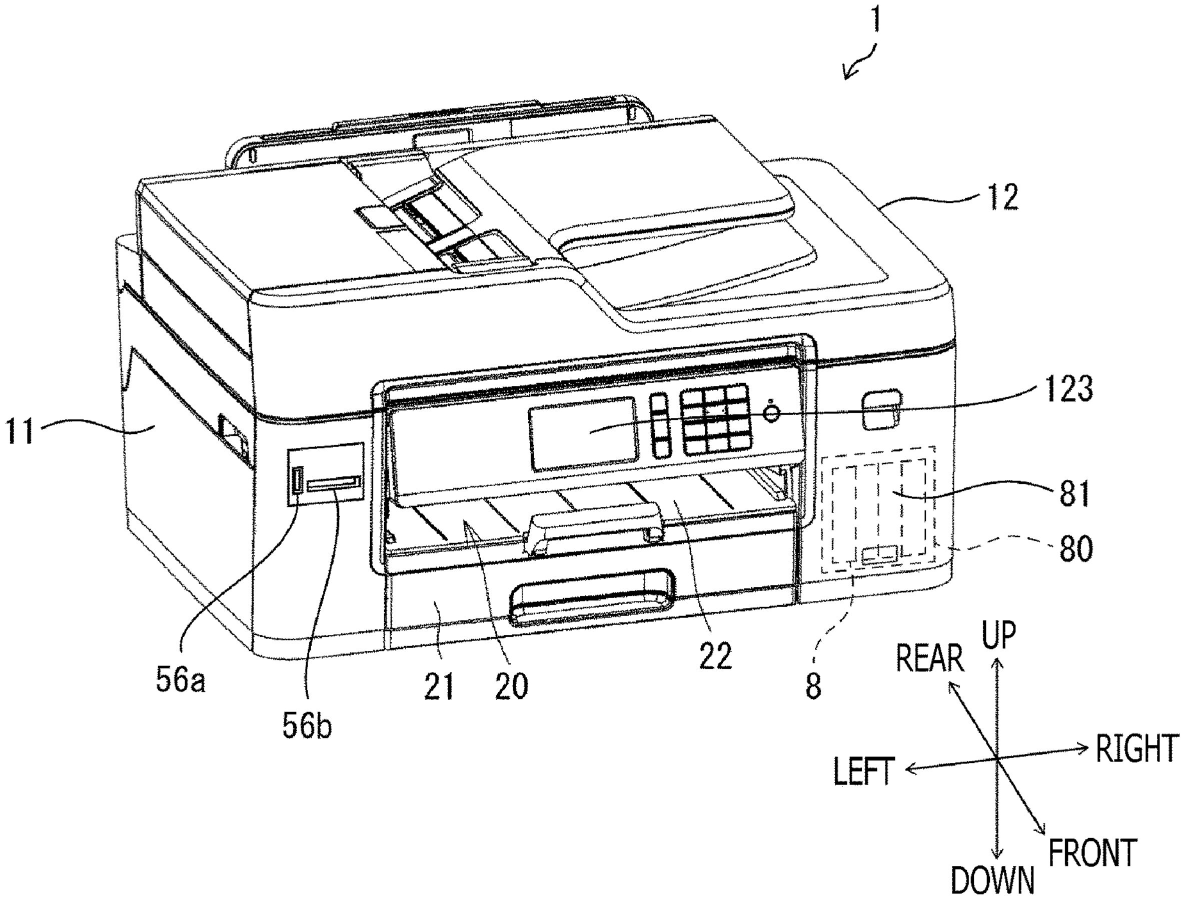
FIG. 1 is a perspective view of a printing apparatus.

Hereinafter, an exemplary embodiment according to an aspect of the present disclosure will be described in detail with reference to the accompanying drawings. FIG. 1 is a perspective view of a printing apparatus 1. The printing apparatus 1 may be a multifunction peripheral machine (MFP) having a printer 11 and an image reader 12. The printer 11 has an inkjet-styled printing function, by which ink may be discharged at a sheet P based on print data designated by a print job to record an image on the sheet P. The image reader 12 is located above an image recorder 3 in the printing apparatus 1 and has a scanning function, by which an image recorded on a sheet P may be read.

Meanwhile, the printer 11 may not necessarily be limited to the inkjet-styled printer but may optionally be an electrophotographic printer. Moreover, the printer 11 may either be a multicolor printer or monochrome-alone printer. In the following paragraphs, for ease of the explanation, positional relation within the printing apparatus 1 and each part or item included in the printing apparatus 1 will be mentioned on basis of a posture of the printing apparatus 1 in a usable condition as shown in FIG. 1, with reference to an orientation (up, down, right, left, front, rear) indicated by the bi-directionally pointing arrows. A front-to-rear or rear-to-front direction may be called as a front-rear direction, an up-to-down or down-to-up direction may be called as a vertical direction, and a left-to-right or right-to-left direction may be called as a widthwise direction.

As shown in FIG. 1, on a front side of the printer 11 in the printing apparatus 1, an opening 20 is formed. In the opening 20, a feeder tray 21 and an ejection tray 22 are arranged movably in the front-rear direction. The feeder tray 21 is a case to store sheets P and is open upward. The ejection tray 22 is located above the feeder tray 21 and may support the sheets P, on which images are recorded. A size of the sheets P to be stored in the feeder tray 21 may be, for example, A4. The sheets P may not necessarily be limited to paper medium but may include, for example, resin sheets such as OHP films.

In a central area on the front side of the printing apparatus 1, a setting device 123 having a display screen is arranged. The setting device 123 may include, for example, a touch panel, through which various types of settings concerning printing actions and/or actions to exchange cutter assemblies 90 may be input with a user's touching operations. The settings input through the setting device 123, which include information concerning the size of the sheets P, information indicating whether a cutting action will be conducted, and/or information concerning exchange of the cutter assemblies 90, may be output to a controller 100 (see FIG. 6).

In a rightward area on the front side of the printing apparatus 1, a cartridge cover 81 is pivotably arranged. Inside the cartridge cover 81, an ink cartridge 8 is arranged to be attached to a cartridge case 80 (see FIG. 3). The ink cartridge 8 may contain liquid, e.g., ink. The ink cartridge 8 will be described further below.

In a leftward area on the front side of the printing apparatus 1, a USB port **56*a* and a slot 56*b* are arranged. Although FIG. 1 illustrates one (1) USB port 56*a* and one (1) slot 56*b*, numbers of the USB port(s) 56*a* and the slot(s) 56*b*** are not necessarily limited to one.

[Configuration of Conveyer Path and Conveyer]

Figure 2:
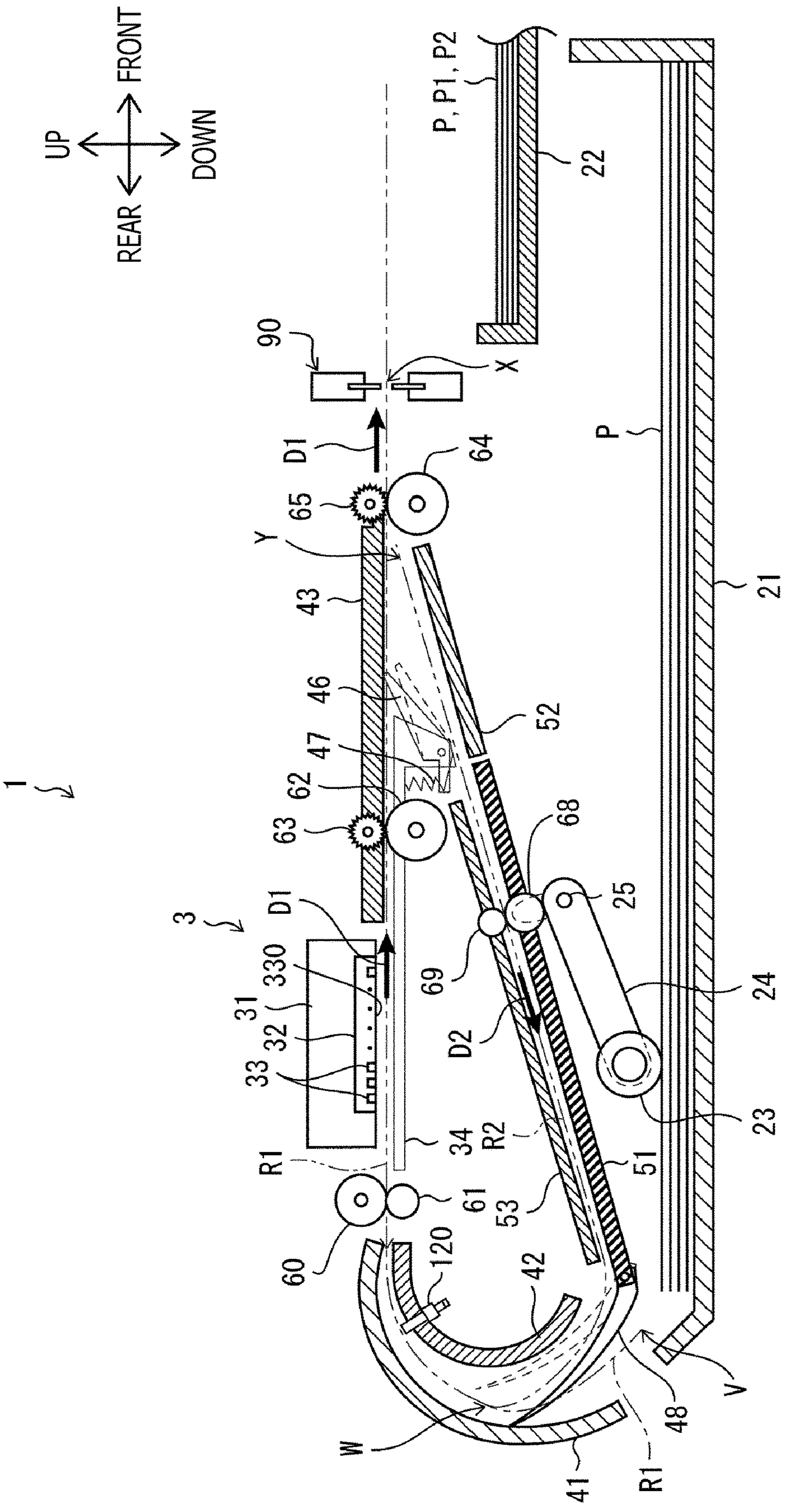
FIG. 2 is a cross-sectional view of the printing apparatus.

A conveyer path and a conveyer in the printing apparatus 1 will be described with reference to FIG. 2. FIG. 2 is a cross-sectional view of the printing apparatus 1 sectioned along a first conveying direction D1. As shown in FIG. 2, inside the printing apparatus 1, a feeder roller 23, a first conveyer path R1, conveyer rollers 60, 62, 64, 68, an image recorder 3, a cutter assembly 90, and a second conveyer path R2 are arranged. The conveyer includes, but not necessarily be limited to, the feeder roller 23 and the conveyer rollers 60, 62, 64, which may convey the sheet P in the first conveying direction D1.

The feeder roller 23 may feed the sheets P stored in the feeder tray 21 to the first conveyer path R1. The feeder roller 23 is rotatably supported at a tip end of a feeder arm 24. The feeder arm 24 is pivotably supported by a shaft 25, which is supported by a frame of the printing apparatus 1. The feeder arm 24 is pivotably urged toward the feeder tray 21 by weight thereof or an urging force of, for example, a spring.

The feeder roller 23 may be driven by a feeder motor 107 (see FIG. 6) to rotate normally. By the normal rotation of the feeder roller 23, the sheets P stored in the feeder tray 21 may be fed to the first conveyer path R1 one by one. Each sheet P fed to the first conveyer path R1 may be conveyed in a direction from the rear toward the front, i.e., in the first conveying direction D1, in the printing apparatus 1.

The first conveyer path R1 refers to a space delimited at least by guide members 41, 42, 43, a platen 34, and upper members of the image recorder 3 which include a head carriage 31, a recording head 32, and a plurality of nozzles 33. The first conveyer path R1 is a path extending from the feeder tray 21 through the image recorder 3 to the ejection tray 22. The first conveyer path R1 curves at a part delimited by the guide members 41, 42. The first conveyer path R1 extends linearly at a part delimited by the platen 34 and the upper members of image recorder 3 and at a part delimited by the guide member 43.

At a position upstream from the image recorder 3 in the first conveying direction D1 along the first conveyer path R1, the conveyer roller 60 is arranged. At a position to face a lower part of the conveyer roller 60, a pinch roller 61 is arranged. The conveyer roller 60 may be driven by a conveyer motor 108 (see FIG. 6) to rotate. The pinch roller 61 may rotate along with the rotation of the conveyer roller 60. By the conveyer roller 60 and the pinch roller 61 rotating normally, the sheet P pinched between the conveyer roller 60 and the pinch roller 61 may be conveyed to the image recorder 3.

As shown in FIG. 2, at a position downstream from the image recorder 3 in the first conveying direction D1 along the first conveyer path R1, the conveyer roller 62 is arranged. At a position to face an upper part of the conveyer roller 62, a spur roller 63 is arranged. The conveyer roller 62 may be driven by the conveyer motor 108 to rotate. The spur roller 63 may rotate along with the rotation of the conveyer roller 62. By the conveyer roller 62 and the spur roller 63 rotating normally, the sheet P pinched between the conveyer roller 62 and the spur roller 63 may be conveyed downstream in the first conveying direction D1.

At a position downstream from the conveyer roller 62 in the first conveying direction D1 along the first conveyer path R1, the conveyer roller 64 is arranged. The conveyer roller 64 is a switchback roller that may rotate either normally or reversely. The conveyer roller 64 may rotate reversely to convey the sheet P in a second conveying direction D2, which is opposite to the first conveying direction D1. The conveyer roller 64 may be driven by the conveyer motor 108 to rotate. At a position to face an upper part of the conveyer roller 64, a spur roller 65 is arranged. The spur roller 65 may rotate along with the rotation of the conveyer roller 64.

By the conveyer roller 64 and the spur roller 65 rotating normally, the sheet P pinched between the conveyer roller 64 and the spur roller 65 may be conveyed downstream in the first conveying direction D1. In other words, the sheet P may be conveyed by the conveyer roller 64 and ejected from the first conveyer path R1 at the ejection tray 22. On the other hand, by the conveyer roller 64 and the spur roller 65 rotating reversely, the sheet P may be conveyed in the second conveying direction D2. The sheet P pinched between the conveyer roller 64 and the spur roller 65 may be conveyed in the second conveying direction D2 along a lower surface of a first flap 46.

At a position downstream from the conveyer roller 64 in the first conveying direction D1 along the first conveyer path R1, the cutter assembly 90 is arranged. The cutter assembly 90 may cut the sheet P into pieces. The cutter assembly 90 will be described further below.

The second conveyer path R2 is a path delimited at least by guide members 51, 52, 53. The second conveyer path R2 branches from the first conveyer path R1 at a branch position Y, which is at an upstream position from the conveyer roller 64 in the first conveying direction D1, and merges with the first conveyer path R1 at a merge position W, which is at a position upstream from the image recorder 3 in the first conveying direction D1 along the first conveyer path R1.

By driving the conveyer roller 64 to rotate reversely and a conveyer roller 68 to rotate, the sheet P with an image recorded on one side thereof may be conveyed in the second conveyer path R2. The sheet P, with the image recorded on the one side thereof, being conveyed in the second conveying direction D2 along the second conveyer path R2 may return to the first conveyer path R1 in a vertically flipped posture. Thus, images may be recorded by the image recorder 3 on both sides of the sheet P.

As shown in FIG. 2, at a position to face the guide member 43 in proximity to the branch position Y, between the conveyer roller 62 and the conveyer roller 64 in the first conveyer path R1, the first flap 46 is arranged. The first flap 46 is supported by the platen 34 and is pivotable between a first posture and a second posture. When the first flap 46 is in the first posture, as drawn in solid lines in FIG. 2, the first flap 46 contacts the guide member 43 and closes the first conveyer path R1. On the other hand, when the first flap 46 is in the second posture, as drawn in broken lines in FIG. 2, the first flap 46 is located to be lower than the first flap 46 in the first posture and is separated from the guide member 43, reserving a gap to allow the sheet P to be conveyed in the first conveying direction D1 between the first flap 46 and the guide member 43.

The first flap 46 is urged upward by a coil spring 47. The coil spring 47 is connected with the first flap 46 at one end and to the platen 34 at the other end. The first flap 46 being urged by the coil spring 47 is placed in the first posture, in which a frontward end of the first flap 46 contacts the guide member 43.

At the merge position W between the first conveyer path R1 and the second conveyer path R2, a second flap 48 is pivotably arranged. In particular, the second flap 48 is pivotable between a first posture, as drawn in solid lines in FIG. 2, and a second posture, as drawn in broken lines in FIG. 2. When the second flap 48 is in the first posture, the second flap 48 and the guide member 42 form a part of the second conveyer path R2. On the other hand, when the second flap 48 is in the second posture, the second flap 48 and the guide member 41 form a part of the first conveyer path R1.

At a position upstream from the conveyer roller 60 in the first conveying direction D1 along the first conveyer path R1, a registration sensor 120 is arranged. The registration sensor 120 is attached to the guide member 42 and may detect a front end and a rear end of the sheet P moving through a contact position, at which the sheet P contacts the conveyer roller 60. The registration sensor 120 may include, for example, a sensor having an actuator that may be moved to swing by the sheet P contacting the actuator, and, for another example, an optical sensor. The registration sensor 120 may output ON signals while the sheet P is moving through the contact position and OFF signals while the sheet P is absent at the contact position. The signals from the registration sensor 120 may be output to the controller 100.

To the conveyer roller 60, a rotary encoder 121 that may detect rotation of the conveyer roller 60 is attached. The rotary encoder 121 may output pulse signals to the controller 100 (see FIG. 6) according to the rotation of the conveyer roller 60. The rotary encoder 121 includes an encoder disk and an optical sensor. The encoder disk may rotate along with the rotation of the conveyer roller 60. The optical sensor may read the rotating encoder disk, generate pulse signals, and output the generated pulse signals to the controller 100.

Figure 3:
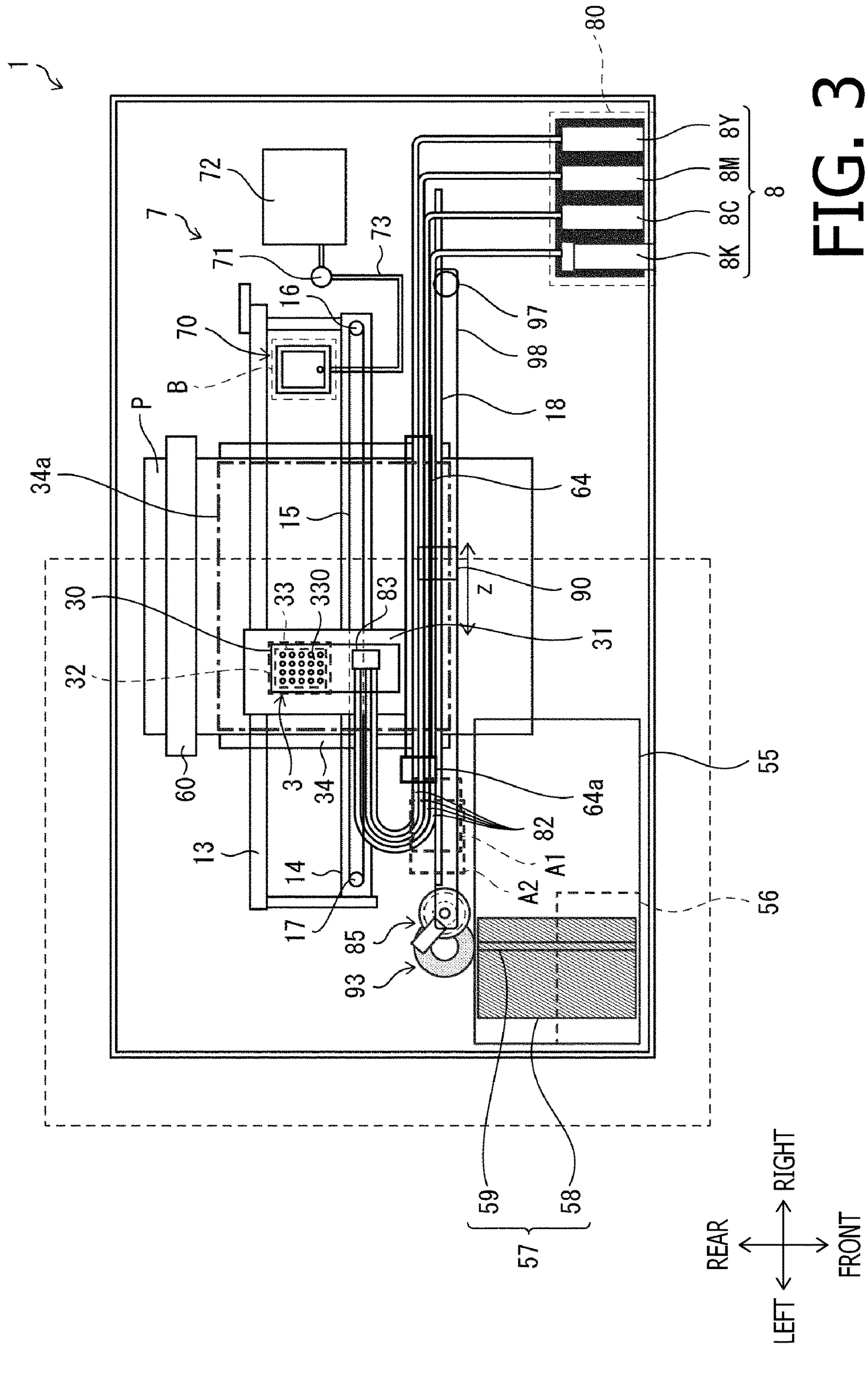
FIG. 3 is a top plan view of the printing apparatus.
Figure 4:
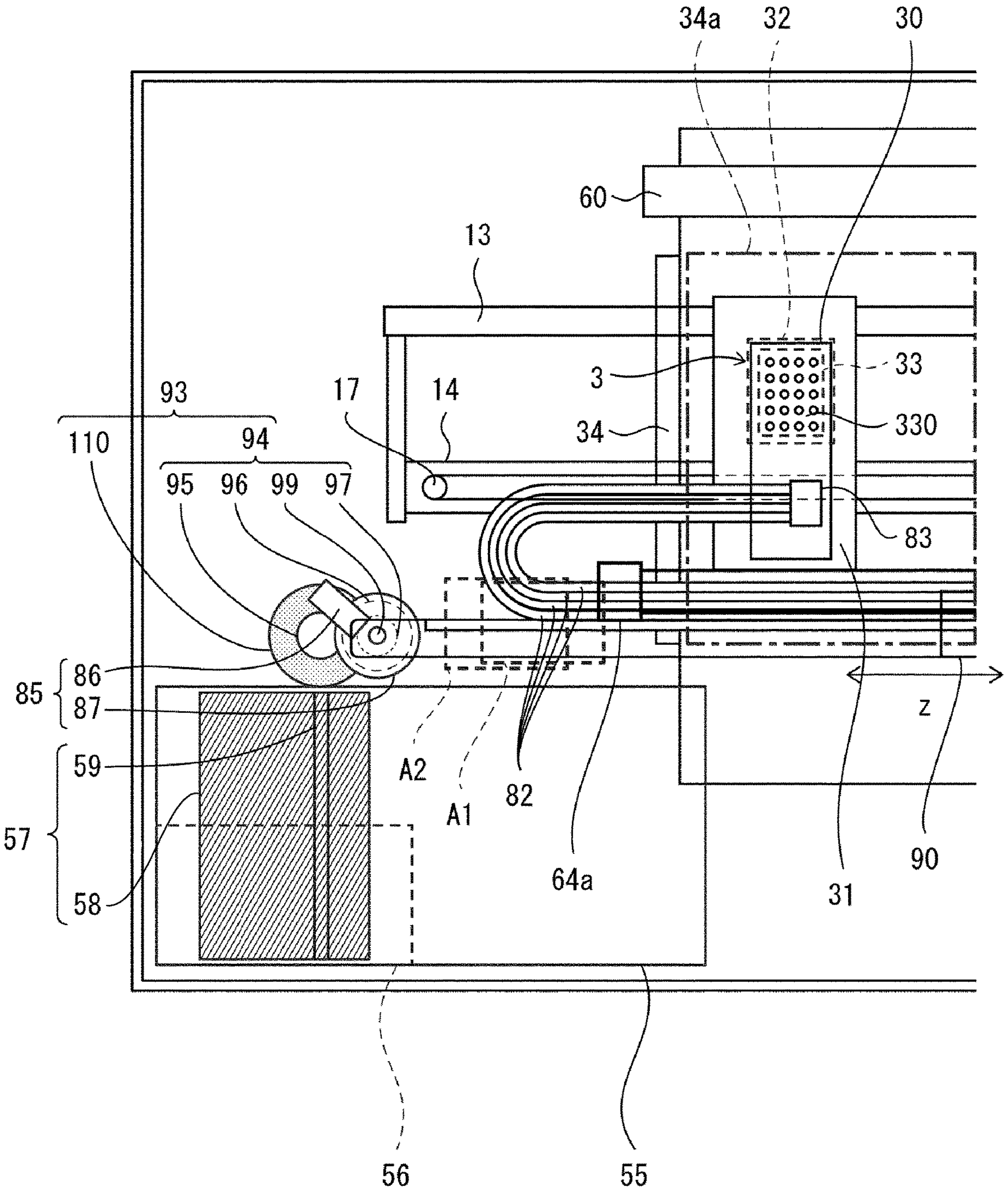
FIG. 4 is an enlarged view of an area enclosed by broken lines in FIG. 3.

Next, with reference to FIGS. 3 and 4, components in the printing apparatus 1 will be described in detail. FIG. 3 is a top plan view of the printing apparatus 1. FIG. 4 is an enlarged view of an area enclosed by broken lines in FIG. 3. In FIGS. 3 and 4, for ease of visual comprehension, some of the items shown in FIG. 2, e.g., the guide member 43 and the conveyer rollers 62, 68, are omitted.

[Configuration of Image Recorder]

As shown in FIG. 3, the image recorder 3 includes a buffer tank 30, the head carriage 31, the recording head 32, the plurality of nozzles 33, and the platen 34. The image recorder 3 may record an image on the sheet P.

The buffer tank 30 may store ink supplied from the ink cartridge 8 through supplying tubes 82. The buffer tank 30 has a tube joint 83 which is formed integrally. To the tube joint 83, ends of four (4) supplying tubes 82 are removably connected. The other ends of the supplying tubes 82 are each connected to one of four (4) ink cartridges 8Y, 8M, 8C, 8K.

The recording head 32 is mounted on the head carriage 31. The recording head 32 is located at a position to face the platen 34. The recording head 32 may discharge the ink stored in the buffer tank 30 at the sheet P to record the image on the sheet P. The recording head 32 may discharge the ink by causing vibration in vibrating elements, such as, for example, piezoelectric devices. A lower surface of the recording head 32 is a nozzle surface 330, on which the plurality of nozzles 33 are formed. The nozzles 33 are continuous with the inside of the buffer tank 30. The ink supplied from the buffer tank 30 may be discharged at the sheet P from the nozzles 33 of the recording head 32.

The platen 34 is a substantially rectangular plate, on which the sheet P conveyed by the conveyer roller 60 may be placed. The platen 34 may support the sheet P thereon. The platen 34 is located on a lower side of the recording head 32 in a direction of the height of the printing apparatus 1, i.e., in the vertical direction. The platen 34 has a supporting portion 34*a* to support the sheet P being conveyed. The supporting portion 34*a* refers to a part or a range of the platen 34 that supports the recording medium conveyed by the conveyer. In other words, the supporting portion 34*a* refers to an area or a range to be passed over by the sheet P being conveyed in the first conveyer path R1. The platen 34 may support the sheet P conveyed by the conveyer roller 60 from the lower side. The recording head 32 may record an image on the sheet P supported by the supporting portion 34*a*. As shown in FIG. 3, the supporting portion 34*a* is located in the central area in the printing apparatus 1 in the widthwise direction.

As shown in FIG. 3, two (2) guide rails 13, 14 are arranged above the platen 34. The guide rails 13, 14 extend in parallel with a scanning direction, which coincides with the widthwise direction in FIG. 3. The head carriage 31 is attached to the guide rails 13, 14. The head carriage 31 is movable along the guide rails 13, 14 in an area to face the platen 34.

To the head carriage 31, a driving belt 15 is attached. The driving belt 15 is an endless belt strained around two (2) pulleys 16, 17. The pulley 16 is coupled with a head-carriage motor 109 (see FIG. 6). When an image is recorded on the sheet P, the pulley 16 is rotated by the carriage motor 109 driving normally or reversely, and the driving belt 15 circulates. Thereby, the head carriage 31 may reciprocate in the widthwise direction, i.e., the scanning direction. When an image is not to be recorded on the sheet P, the head carriage 31 stands by at a predetermined standby position B.

[Configuration of Ink Cartridge]

The ink cartridge 8 is a container having a shape of rectangular box to store the ink therein. The ink cartridge 8 includes four (4) ink cartridges 8Y, 8M, 8C, 8K, which contain ink in colors of yellow (Y), magenta (M), cyan (C), and black (B), respectively. The inks stored in the ink cartridge 8 may be pigment inks, in which pigment particles are dispersed in a solvent. The number of ink cartridge 8 is not necessarily limited to four (4), but may be, for example, six (6) or eight (8). Further, in the case where the printing apparatus 1 is a monochrome printer, a single ink cartridge 8K corresponding to black may be provided.

As shown in FIG. 3, the ink cartridges 8Y, 8M, 8C, 8K are connected to the image recorder 3 through four supplying tubes 82. The supplying tubes 82 may be made of a flexible material and connect the inside of the ink cartridge 8 and the inside of the buffer tank 30 in the image recorder 3. Although not shown in the drawings, a flexible flat cable to connect the controller 100 and the recording head 32 electrically is extended to the head carriage 31.

The ink cartridge 8 is located, in the front-rear direction, on the frontward side and, in the widthwise direction, on the rightward side, in the printing apparatus 1. The ink cartridge 8 is located on a frontward side in the printing apparatus 1 with respect to a supporting rail 18, which extends in a scanning direction Z of the cutter assembly 90. The ink cartridge 8 is located on a frontward side in the printing apparatus 1 with respect to a standby position A1 and an exchangeable position A2 for the cutter assembly 90.

[Configuration of Suction Assembly]

A suction assembly 7 may perform a suction-purging action as a maintenance work for the nozzles 33 to regain a discharging ability. The suction assembly 7 includes a cap 70, a suction pump 71, and a waste liquid tank 72. The cap 70 may be attached to the recording head 32 to cover the nozzle surface 330 when the head carriage 31 is at the standby position B and seal the nozzles 33. With the cap 70 covering the nozzle surface 330, the nozzles 33 may be restrained from drying. With the head carriage 31 located at the standby position B, the suction-purging action to expel the ink from the nozzles 33 may be performed. When the controller 100 activates the suction pump 71, the fluid in the cap 70 including the ink may be suctioned. The ink suctioned by the suction pump 71 may be collected in the waste liquid tank 72 through tubes 73.

[Configuration of Cutter Assembly]

Figure 5:
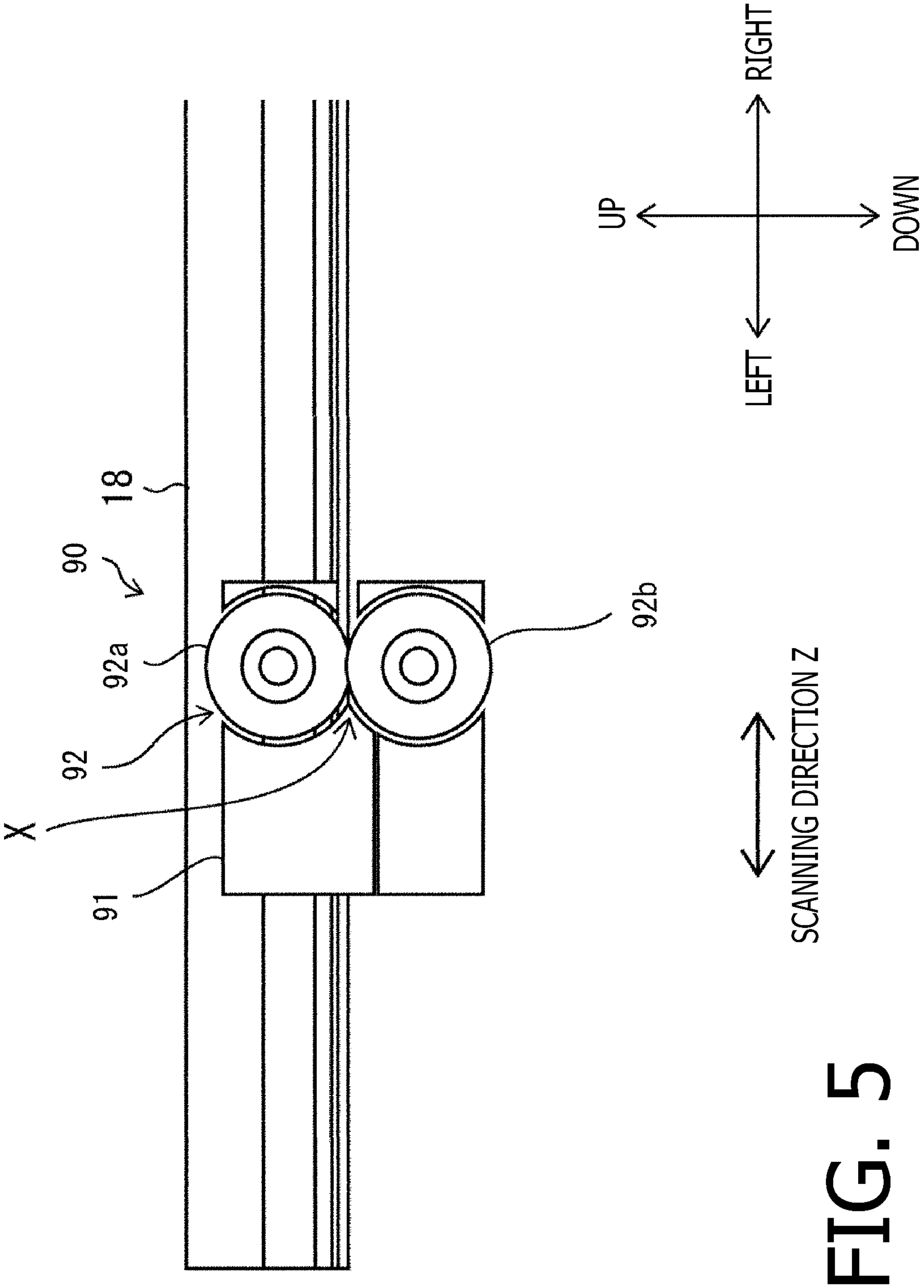
FIG. 5 is an exterior view of a cutter assembly in the printing apparatus.

The cutter assembly 90 may cut the sheet P into smaller pieces. An overall configuration of the cutter assembly 90 will be described with reference to FIG. 5. FIG. 5 is an exterior view of the cutter assembly 90 in the printing apparatus 1. As shown in FIG. 5, the cutter assembly 90 includes a cutter carriage 91 and a cutter unit 92. On the cutter carriage 91, the cutter unit 92 is mounted. The cutter unit 92 is fastened to the carriage 91 with, for example, screws. The user may remove the cutter unit 92 from the cutter carriage 91 when the cutter carriage 91 is located at the exchangeable position A2 by loosening the screws with a tool and thereby perform the maintenance work on the cutter unit 92.

The cutter unit 92 includes an upper blade 92*a* and a lower blade 92*b*, which are each in a shape of a disk. The upper blade 92*a* and the lower blade 92*b* are rotatably attached to the cutter carriage 91.

The cutter assembly 90 may cut the sheet P at a cutting position X. The upper blade 92*a* and the lower blade 92*b* may rotate and contact each other at the cutting position X, and thereby the sheet P between the upper blade 92*a* and the lower blade 92*b* may be cut. The sheet P cut by the cutter assembly 90 may be divided into two pieces: a first sheet on a frontward side and a second sheet on a rearward side. Optionally, the cutter assembly 90 may cut the sheet P into three (3) pieces. Moreover, optionally, the position(s) at which the sheet P is cut may be changeable depending on the size of the print data.

Optionally, the upper blade 92*a* and the lower blade 92*b* may be stationary blades or may be a pair of a stationary blade and a rotatable blade. Further optionally, the cutter unit 92 may solely have one of the upper blade 92*a* and the lower blade 92*b*. In this arrangement, the cutting position X may be a position, at which the one of the upper blade 92*a* and the lower blade 92*b* contacts the sheet P. Furthermore, a shape and a size of the cutter unit 92 may optionally be modified.

[Positional Relation between Standby Position and Exchangeable Position]

As shown in FIG. 3, the standby position A1 is located on a side of the supporting portion 34*a* opposite to the side, on which the ink cartridge 8 is arranged, in a scanning direction Z of the cutter assembly 90, on an outside of the supporting portion 34*a* in the scanning direction Z. The scanning direction Z intersects with the first conveying direction D1. For example, the scanning direction Z may coincide with the widthwise direction of the printing apparatus 1. In this regard, the standby position A1 may be located on the leftward side, while the ink cartridge 8 is arranged on the rightward side, from the supporting portion 34*a* in the widthwise direction. The standby position A1 is an area, in which the cutter assembly 90 stays idle to wait for a cutting action while the cutter assembly 90 is not cutting the sheet P. When the cutter assembly 90 is located at the standby position A1, the cutter unit 92 in the cutter assembly 90 is located at a position, at which the cutter unit 92 may not contact the sheet P being conveyed in the first conveyer path R1. In other words, at least the cutting position X in the cutter assembly 90 is located outside the supporting portion 34*a* of the platen 34 in the scanning direction Z.

The exchangeable position A2 is located on the side of the supporting portion 34*a* opposite to the side, on which the ink cartridge 8 is arranged, in the scanning direction Z, on the outside of the supporting portion 34*a* in the scanning direction Z. In other words, the exchangeable position A2 may be located on the leftward side while the ink cartridge 8 is located on the rightward side from the supporting portion 34*a* in the widthwise direction. The exchangeable position A2 is an area, in which the cutter assembly 90 is located to be exchanged with another cutter assembly 90. The exchangeable position A2 is located on the same side of the supporting portion 34*a* as the standby position A1 in the scanning direction Z. The exchangeable position A2 is located at a position outward with respect to the exchangeable position A2.

The exchangeable position A2 is located at a position rearward with respect to the setting device 123 and lower than the image reader 12. Moreover, in the front-rear direction of the printing apparatus 1, the exchangeable position A2 is located rearward with respect to the cartridge case 80 for the ink cartridge 8. In the printer 11, an opening (not shown), through which the cutter unit 92 in the cutter assembly 90 is exchangeable, is formed at a position corresponding to the exchangeable position A2. The opening is continuous with the exchangeable position A2 and has a size, through which the cutter unit 92 of the cutter assembly 90 may pass. The opening is formed on an upper surface of the printer 11. The user may remove the cutter unit 92 from the cutter carriage 91 of the cutter assembly 90 located at the exchangeable position A2 through the opening. Optionally, the opening may be formed on a sideward surface of the printer 11.

[Configuration of Cutter-Carriage Driving Assembly]

As shown in FIGS. 3 and 4, a cutter-carriage driving assembly 93 is provided in the printing apparatus 1. The cutter-carriage driving assembly 93 may move the cutter assembly 90 on the supporting rail 18, which extends in the scanning direction Z of the cutter assembly 90. The cutter-carriage driving assembly 93 is located on the same side as the standby position A1 of the cutter assembly 90 in the scanning direction Z of the cutter assembly 90. In other words, in the scanning direction Z, the cutter-carriage driving assembly 93 is arranged on the side opposite to the side, on which the ink cartridge 8 is arranged.

As shown in FIG. 4, the cutter-carriage driving assembly 93 includes a cutter-carriage motor 110, a first driving-force transmission 94, and an endless belt 98. The first driving-force transmission 94 includes a main driving gear 95, a driven gear 96, a pulley 97, and a rotation shaft 99. The main driving gear 95 is attached to a rotation shaft of the cutter-carriage motor 110. The main driving gear 95 meshes with the driven gear 96. The pulley 97 is attached to a rotation shaft 99 of the driven gear 96. The endless belt 98 is wound around the pulley 97. A number of the driven gear(s) 96 and a number of the pulley(s) 97 may not necessarily be limited to those as illustrated in the drawings, but the driven gear 96 may include a plurality of driven gears 96, and the pulley 97 may include a plurality of pulleys 97.

The controller 100 may control the cutter-carriage motor 110 to drive. When the cutter-carriage motor 110 drives, the driving force from the cutter-carriage motor 110 is transmitted from the main driving gear 95 to the driven gear 96, and the driven gear 96 rotates. Along with the rotation of the driven gear 96, the rotation shaft 99 rotates, and the pulley 97 attached to the rotation shaft 99 rotates. As the pulley 97 rotates, the endless belt 98 circulates, and the cutter carriage 91 connected with the endless belt 98 moves along the supporting rail 18.

[Configuration of Position Detector]

As shown in FIG. 4, a position detector 85 is arranged at a position adjacent to the driven gear 96 of the cutter-carriage driving assembly 93. The position detector 85 may detect a position of the cutter assembly 90 moving in the scanning direction Z. The position detector 85 is located on the same side of the supporting portion 34*a* as the standby position A1 of the cutter assembly 90 in the scanning direction Z of the cutter assembly 90. In other words, in the scanning direction Z, the position detector 85 is arranged on the side opposite to the side, on which the ink cartridge 8 is arranged. The position detector 85 includes a position sensor 86 and an encoder disk 87.

The position sensor 86 is an optical sensor having a light emitter and a light receiver, which are not shown. The light receiver of the position sensor 86 may receive light emitted from the light emitter and reflected off the encoder disk 87. The encoder disk 87 has a scale formed with slits. The encoder disk 87 is attached to the rotation shaft 99 of the driven gear 96 and may rotate along with the rotation of the driven gear 96. The position detector 85 may detect the position of the cutter carriage 91 on the supporting rail 18 by the position sensor 86 detecting the scale of the encoder disk 87. Optionally, the position sensor 86 may detect the scale in the encoder disk 87 magnetically.

[Configuration of Conveyer-Roller Driving Assembly]

The printing apparatus 1 has a conveyer-roller driving assembly, which is not shown in the drawings. The conveyer-roller driving assembly may rotate the conveyer rollers 60, 62, 64, 68. The conveyer-roller driving assembly includes the conveyer motor 108 (see FIG. 6), a conveyer-roller driving-force transmission and a switching assembly, which are not shown, and a conveyer-roller driving-force transmission 64*a*.

The conveyer-roller driving-force transmission (not shown) may transmit a driving force from the conveyer motor 108 to the conveyer rollers 60, 62, 64, 68. As the conveyer motor 108 drives, the conveyer-roller driving-force transmission may transmit the driving force from the conveyer motor 108, and the conveyer roller 60 may rotate. The conveyer-roller driving-force transmission may transmit the driving force transmitted to the conveyer roller 60 from the conveyer motor 108 further to the conveyer rollers 62, 64, 68. The conveyer roller driving force transmission 64*a* may transmit the driving force from the conveyer motor 108 to the conveyer roller 64 and is located on the same side of the supporting portion 34*a* as the standby position A1 of the cutter assembly 90 in the scanning direction Z of the cutter assembly 90. In other words, in the scanning direction Z, the conveyer roller driving force transmission 64*a* is located on the side opposite to the side, on which the ink cartridge 8 is located. The conveyer-roller driving-force transmission 64*a* may be formed with gear(s) and/or pulley (s).

The switching assembly may switch destinations of the driving force from the conveyer motor 108. The switching assembly may include gear(s) and a switching lever. Depending on the switching lever being operated or unoperated, the driving force transmitted from the conveyer motor 108 to the conveyer roller 60 may be selectively transmitted to the conveyer rollers 62, 64, 68.

When the switching lever in the switching assembly stays unoperated, the driving force from the conveyer motor 108 is transmitted to the conveyer rollers 60, 62, 64. In this setting, as the conveyer motor 108 rotates normally, the sheet P may be conveyed in the first conveying direction D1. On the other hand, when the switching lever in the switching assembly is operated, the driving force from the conveyer motor 108 is transmitted to the conveyer rollers 60, 62, 64, 68. In this setting, as the conveyer motor 108 rotate reversely, the sheet P may be conveyed in the second conveying direction D2.

[Configurations of Controller Board, Communication Board, and Power Supply Board]

A controller board 55 is located on the same side of the supporting portion 34*a* as the standby position A1 of the cutter assembly 90 in the scanning direction Z of the cutter assembly 90. In other words, in the scanning direction Z, the controller board 55 is located on the side opposite to the side, on which the ink cartridge 8 is arranged. The controller board 55 is located, in the front-rear direction, on the frontward side of the printing apparatus 1 and, in the direction of height, i.e., in the vertical direction, on an upper side of the printing apparatus 1. The controller board 55 is a board, on which the controller 100 to control operations in the printing apparatus 1 is mounted.

The communication board 56 is located on the same side of the supporting portion 34*a* as the standby position A1 of the cutter assembly 90 in the scanning direction Z of the cutter assembly 90. In other words, in the scanning direction Z, the communication board 56 is located on the side opposite to the side, on which the ink cartridge 8 is arranged. The communication board 56 is located, in the front-rear direction, on the frontward side of the printing apparatus 1 and, in the direction of height, i.e., in the vertical direction, on the upper side of the printing apparatus 1. The communication board 56 forms a part of the controller board 55. The controller board 55 includes an input/output interface (I/F) 124, through which the printing apparatus 1 may communicate with an external device. In particular, the communication board 56 has the USB port 56*a* and the slot 56*b*.

A power unit 57 is located on the same side of the supporting portion 34*a* as the standby position A1 in the scanning direction Z of the cutter assembly. In other words, in the scanning direction Z, the power unit 57 is located on the side opposite to the side, on which the ink cartridge 8 is arranged. The power unit 57 is located, in the front-rear direction, on the frontward side of the printing apparatus 1 and, in the direction of height, i.e., in the vertical direction, on a lower side of the printing apparatus 1.

The power unit 57 includes a housing 58 and a power supply board 59. The housing 58 is made of metal. Inside the housing 58, the power supply board 59 is arranged. The power supply board 59 may supply power to the devices in the printing apparatus 1 that require electrical power. On a surface of the power supply board 59, a power circuit and electrical devices are mounted. The power supply board 59 is connected with a power cord. The power cord extends rearward in the printing apparatus 1 from the power supply board 59 and is drawn outward.

The power supply board 59 in the power unit 57 is located, in the vertical direction, at a position different from the controller board 55 and from the communication board 56. In a top plan view where the printing apparatus 1 placed on a horizontal plane in the usable condition is viewed from above, the power supply board 59 is arranged to at least partly overlap the controller board 55 and the communication board 56. The controller board 55, the communication board 56, and the power supply board 59 are arranged on the frontward side of the printing apparatus 1 with respect to the standby position A1 and the exchangeable position A2 of the cutter assembly 90.

[Electrical Configuration of Printing Apparatus]

Figure 6:
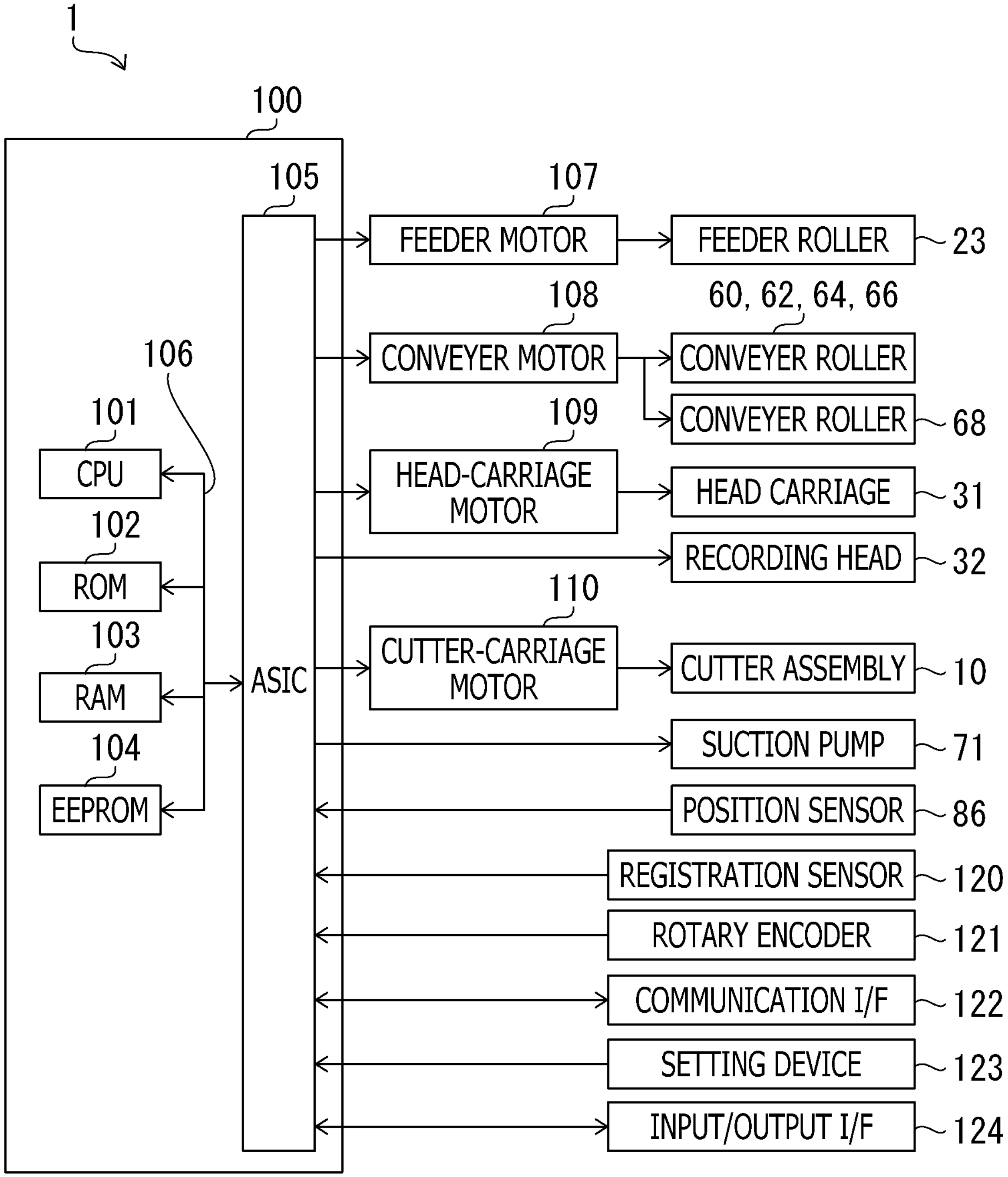
FIG. 6 is a block diagram to illustrate an electrical configuration of the printing apparatus.

Next, an electrical configuration of the printing apparatus 1 will be described with reference to FIG. 6. FIG. 6 is a block diagram to illustrate the electrical configuration of the printing apparatus 1. Further to the components including the controller 100 described above, as shown in FIG. 6, the printing apparatus 1 includes a communication interface (I/F) 122.

The controller 100 includes a central processing unit (CPU) 101, a read only memory (ROM) 102, a random access memory (RAM) 103, an EEPROM, and an ASIC 105, which are mutually connected through an internal bus 106. EEPROM is a registered trademark of Renesas Electronics Corp. The ROM 102 may store programs to conduct operations in the printing apparatus 1.

The RAM 103 may serve as a storage area to temporarily store various types of data to be used when the CPU 101 executes the programs and a work area for various types of data and programs. The EEPROM 104 stores setting information to be maintained when the power to the printing apparatus 1 is on and off. The controller 100 may control actions in the printing apparatus 1 based on the controlling program read from the ROM 102.

The ASIC 105 is connected with the feeder motor 107, the conveyer motor 108, the head-carriage motor 109, the recording head 32, the cutter-carriage motor 110, the suction pump 71, the position sensor 86, the registration sensor 120, the rotary encoder 121, the communication I/F 122, the setting device 123, and the input/output I/F 124.

The ASIC 105 may supply driving current to the feeder motor 107, the conveyer motor 108, the head-carriage motor 109, and the cutter-carriage motor 110. The controller 100 may control rotation of the feeder motor 107, the conveyer motor 108, the head-carriage motor 109, and the cutter-carriage motor 110 under, for example, pulse-width modulation control (PWM).

The controller 100 may apply driving voltage to the vibrating elements in the recording head 32 to cause the ink droplets to be discharged through the nozzles 33. The controller 100 may detect an amount of rotation of the conveyer roller 60 based on the pulse signals output from the rotary encoder 121. The controller 100 may detect the sheet P passing through the contact position, at which the sheet P contacts the conveyer roller 60, based on the detected signals from the registration sensor 120. After the registration sensor 120 outputs the on signals, the controller 100 may estimate an amount of conveyance of the sheet Pin the first conveyer path R1 based on the pulse signals output from the rotary encoder 121.

The communication I/F 122 is connected to a network such as LAN and establishes connection with an external device, in which a driver for the printing apparatus 1 is installed. The printing apparatus 1 may receive a print job including identifying information to identify a type of the sheet P to be used through the communication I/F 122.

The input/output I/F 124 is an interface to establish communication with an external device. In particular, the input/output I/F 124 includes the USB port 56*a*, through which communication with an external device having a connector in compliance with the USB standard is established, and the slot 56*b*, through which communication with a card-typed memory device such as a memory card is established. Optionally, the input/output I/F 124 may be a LAN port, through which a wired LAN is connectable.

[Controlling Flow for Printing by Controller]

Figure 7:
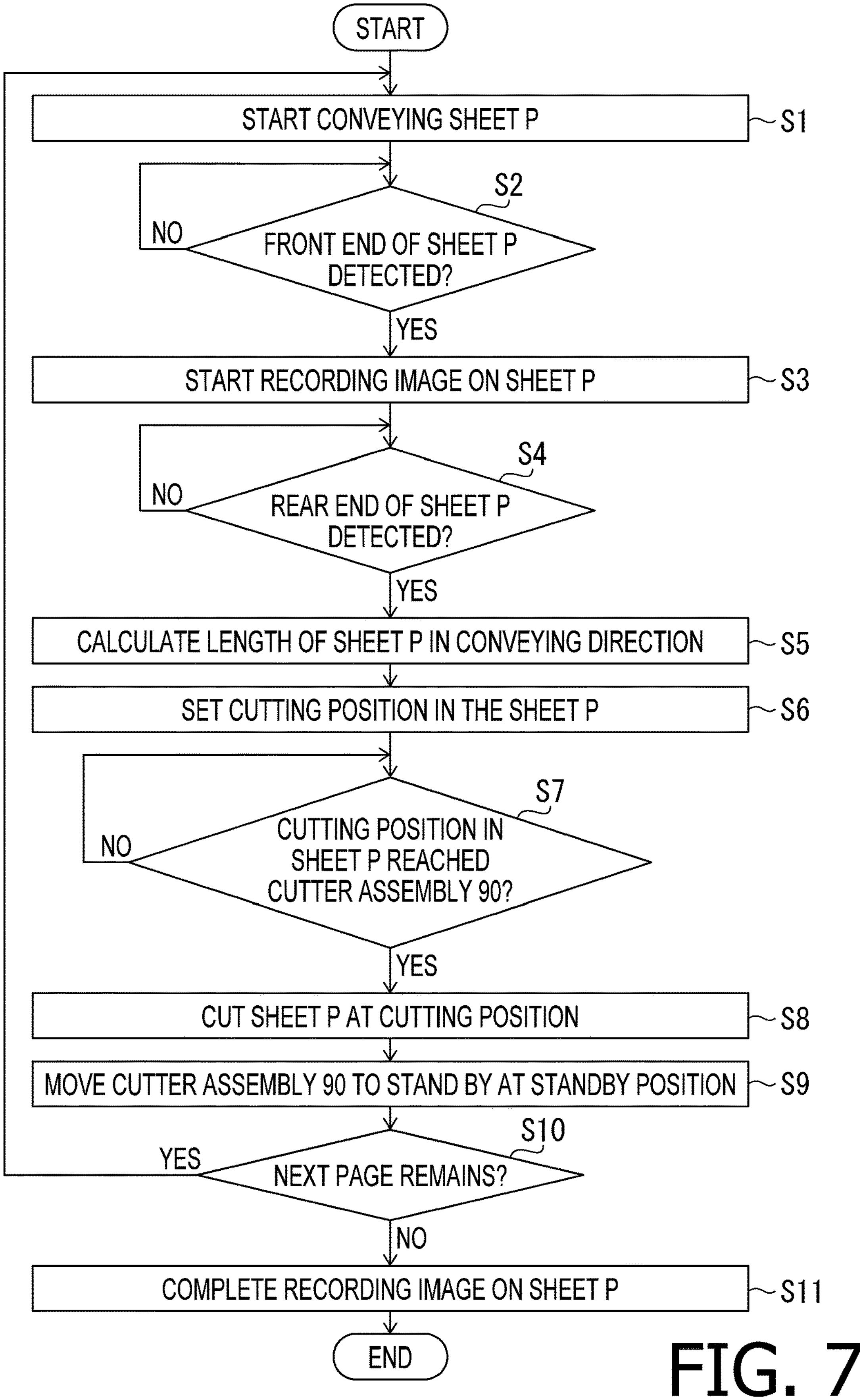
FIG. 7 is a flowchart to illustrate a controlling flow to print an image in the printing apparatus.

Next, a controlling flow for printing by the controller 100 in the printing apparatus 1 will be described with reference to FIG. 7. FIG. 7 is a flowchart to illustrate the controlling flow for printing an image in the printing apparatus 1.

As shown in the flowchart in FIG. 7, the controller 100 receiving a print job through the communication I/F 122 starts driving the feeder motor 107 and rotates the feeder roller 23 normally to pick up the sheet P from the feeder tray 21 and start conveying the sheet P (S1). Thereby, the sheet P may be conveyed from the feeder tray 21 to the first conveyer path R1 and toward the image recorder 3.

Next, based on a detected result from the registration sensor 120, the controller 100 determines whether the registration sensor 120 detected a front end of the sheet P (S2). If the controller 100 determines that the registration sensor 120 did not detect the front end of the sheet P (S2: NO), the flow repeats S2. If the controller 100 determines that the registration sensor 120 detects the front end of the sheet P (S2: YES), the controller 100 operates the image recorder 3 and starts recording of the image on the sheet P (S3).

In particular, in S3, the controller 100 conducts an image recording process, in which a linefeed action and a recording action are repeated alternately, to record the image on the sheet P. In other words, in the linefeed action, the controller 100 operates the conveyer motor 108 to rotate normally to drive the conveyer rollers 60, 62, 64. Thereby, the sheet P may be conveyed in the first conveying direction D1 by a predetermined conveying amount. In the recording action, the controller 100 controls the conveyer motor 108 to pause, drives the head-carriage motor 109 to move the head carriage 31 in the widthwise direction, and operates the recording head 32 to discharge the ink droplets at the sheet P. Thereby, a line of image may be recorded on the sheet P.

Following S3, the controller 100 determines whether the registration sensor 120 detected a rear end of the sheet P (S4). If the controller 100 determines that the registration sensor 120 did not detect the rear end of the sheet P (S4: NO), the flow repeats S4. If the controller 100 determines that the registration sensor 120 detected the rear end of the sheet P (S4: YES), the controller 100 calculates a length of the sheet P in the first conveying direction D1 (S5).

In particular, the controller 100 may calculate a length A of the sheet P in the first conveying direction D1 based on an amount of conveyance of the sheet P, which is detected by the rotary encoder 121, between the detection of the front end by the registration sensor 120 and the detection of the rear end of the sheet P by the registration sensor 120.

Based on the length A of the sheet P in the first conveying direction D1 calculated in S5, the controller 100 sets a dividing position in the sheet P (S6). Following S6, based on the detected results from the registration sensor 120 and the rotary encoder 121, the controller 100 determines whether the dividing position in the sheet P reached the position of the cutter assembly 90 (S7).

If the dividing position in the sheet P has not reached the position of the cutter assembly 90 (S7: NO), the flow repeats S7. On the other hand, if the dividing position in the sheet P reached the position of the cutter assembly 90 (S7: YES), the controller operates the cutter assembly 90 to move from the standby position A1 in the scanning direction Z (S8). Thereby, the sheet P may be divided at the dividing position into the first sheet P1 and the second sheet P2 (S8).

Following S8, the controller 100 operates the cutter assembly 90 to return to the standby position A1 (S9). Following S9, the controller 100 determines whether a next page to print remains. If no next page remains (S10: NO), the controller 100 operates the conveyer motor 108 to eject the first sheet P1 and the second sheet P2 at the ejection tray 2 and ends the image recording with the sheet P thereat (S11).

On the other hand, if a next page to print remains (S10: YES), the controller 100 operates the image recorder 3 to complete printing an image on the second sheet P2, operates the conveyer motor 108 to eject the first sheet P1 and the second sheet P2 at the ejection tray 2, and returns to S1. Thereafter, the flow from S2 through S10 is repeated.

[Controlling Flow for Exchanging Cutter Assembly by Controller]

Figure 8:
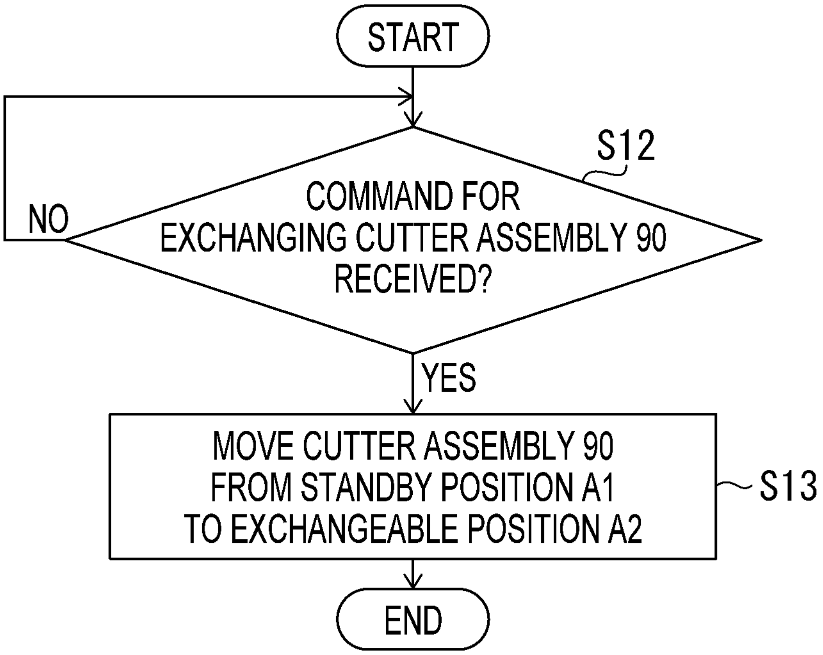
FIG. 8 is a flowchart to illustrate a controlling flow to prepare for exchanging cutter assemblies in the printing apparatus.

Next, a controlling flow for preparation for exchanging the cutter assembly 90 by the controller 100 in the printing apparatus 1 will be described with reference to FIG. 8. FIG. 8 is a flowchart to illustrate the controlling flow for preparation for exchanging the cutter assembly 90 in the printing apparatus 1. As shown in the flowchart in FIG. 8, the controller 100 determines whether a command for exchanging the cutter assembly 90 is received (S12).

If no command for exchanging the cutter assembly 90 is received (S12: NO), the flow repeats S12. On the other hand, if the command for exchanging the cutter assembly 90 is received (S12: YES), the controller 100 operates the cutter assembly 90 to move in the scanning direction Z from the standby position A1 to the exchangeable position A2 (S13).

In S13, the controller 100 operates the cutter assembly 90 to move from the standby position A1 to the exchangeable position A2 at a slower speed than a moving speed of the cutter assembly 90 when the cutter assembly 90 cuts the sheet P in S8 (see FIG. 7). Therefore, an impact on the cutter assembly 90 when moving to the exchangeable position A2 may be reduced.

According to the printing apparatus 1 in the embodiment described above, the standby position A1 of the cutter assembly 90 is located on the side opposite to the side, on which the ink cartridge 8 is arranged, across the supporting portion 34*a* located in the area where the sheet P passes through. In this arrangement, the center of gravity of the printing apparatus 1 is located in the central area in the widthwise direction in the printing apparatus 1. Therefore, handleability of the printing apparatus 1 may be improved.

Moreover, as shown in FIG. 3, the ink cartridge 8 is located frontward with respect to the standby position A1 of the cutter assembly 90. In other words, the ink cartridge 8 is located in the frontward area in the printing apparatus 1. Therefore, the ink cartridge 8 may be arranged at the position, in which the user may access easily. Therefore, the user may exchange the ink cartridges 8 easily.

Moreover, as shown in FIG. 3, the exchangeable position A2 of the cutter assembly 90 is located on the same side of the supporting portion 34*a* as the standby position A1 of the cutter assembly 90, and the exchangeable position is located on the side of the supporting portion 34*a* opposite to the side, on which the ink cartridge 8 is arranged. Therefore, not only when the cutter assembly 90 is located at the standby position A1, but also when the cutter assembly 90 is moved to the exchangeable position A2, the center of gravity of the printing apparatus 1 may be located in the central area in the widthwise direction. In this regard, when the printing apparatus 1 is placed, for example, near an edge of a desk or a table, the printing apparatus 1 may be restrained from falling from the desk or the table.

Moreover, as shown in FIG. 3, the exchangeable position A2 is located in the area unoccupied at the position outward from the standby position A1 in the scanning direction Z of the cutter assembly 90. While an opening may be formed in the vicinity of the exchangeable position A2 for accessibility for the user to access the cutter assembly 90, a larger space may be available around the exchangeable position A2. Therefore, the user may exchange the cutter assembly 90 with another cutter assembly 90 easily.

Moreover, as shown in FIGS. 3 and 4, the cutter-carriage driving assembly 93 is located on the same side of the supporting portion 34*a* as the standby position A1 of the cutter assembly 90. In other words, the cutter-carriage driving assembly 93 is located on the side of the supporting portion 34*a* opposite to the side, on which the ink cartridge 8 is arranged. Therefore, the center of gravity of the printing apparatus 1 may be located in the central area in the widthwise direction in the printing apparatus 1. Therefore, handleability of the printing apparatus 1 may be improved.

Moreover, as shown in FIGS. 3 and 4, the first driving-force transmission 94 is located on the same side of the supporting portion 34*a* as the standby position A1 of the cutter assembly 90. In other words, the first driving-force transmission 94 is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, the position detector 85 is located on the same side of the supporting portion 34*a* as the standby position A1 of the cutter assembly 90. In other words, the position detector 85 is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, the conveyer-roller driving-force transmission 64*a* is located on the same side of the supporting portion 34*a* as the standby position A1 of the cutter assembly 90. In other words, the conveyer-roller driving-force transmission 64*a* is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, the power supply board 59 is located on the same side of the supporting portion 34*a* as the standby position A1 of the cutter assembly 90. In other words, the power supply board 59 is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, the communication board 56 is located on the same side of the supporting portion 34*a* as the standby position A1 of the cutter assembly 90. In other words, the communication board 56 is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, the controller board 55 is located on the same side of the supporting portion 34*a* as the standby position A1 of the cutter assembly 90. In other words, the controller board 55 is located on the side of the supporting portion 34*a* opposite to the side, on which the ink cartridge 8 is arranged. Therefore, the center of gravity of the printing apparatus 1 may be located near the widthwise center of the printing apparatus 1. Therefore, handleability of the printing apparatus 1 may be improved.

Moreover, as shown in FIGS. 3 and 4, on the side of the supporting portion 34*a* opposite to the side, on which the ink cartridge 8 is arranged, the power supply board 59 is located at the position displaced from the controller board 55 and the communication board 56 in the vertical direction, and in the top plan view, the power supply board 59 is arranged to at least partly overlap the controller board 55 and the communication board 56. Therefore, a volume of the space, in which the controller board 55, the communication board 56, and the power supply board 59 are arranged may be reduced, and the printing apparatus 1 may be downsized.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

MORE EXAMPLES

For example, the sheet P may not be necessarily be conveyed by rollers, such as the feeder roller 23, the conveyer rollers 60, 62, 64, 68 but may be conveyed by, for example, a belt and/or a drum.

For another example, the feeder motor 107 may optionally be omitted, and the conveyer motor 108 may serve to drive the feeder roller 23.

For another example, the printing apparatus 1 as the embodiment of the present disclosure may not necessarily be limited to the cartridge-typed printing apparatus, in which the ink cartridge 8 is attachable to the cartridge case 80, but may include, for example, a tank-typed printing apparatus, in which an ink cartridge in a form of a bottle is directly connected to an ink-supplying port to the supplying tube 82.

For another example, the sheet P may not necessarily be conveyed by the conveyer roller 64 to be ejected at the ejection tray 22, but another conveyer roller to eject the sheet P at the ejection tray 22 may be provided on a downstream side from the conveyer roller 64 in the first conveying direction D1.

For another example, the printing apparatus 1 may not necessarily have the first conveyer path R1 and the second conveyer path R2 but may have the first conveyer path R1 alone.

For another example, the front end and the rear end of the sheet P being conveyed may not necessarily be detected by the registration sensor 120, but the image recorder 3 may have a medium sensor that may detect presence or absence of the sheet P on the platen 34, and the front end and the rear end of the sheet P being conveyed may be detected by the medium sensor.

For another example, the position detector 85 may not necessarily be limited to the position sensor 86 detectable of the scale in the encoder disk 87. For example, a laser-beam emitter to emit a laser beam may be provided, and the position of the cutter assembly 90 may be detected based on the reflection of the laser beam. For another example, a sensor to detect an origin point of the cutter assembly 90 based on a contact with the cutter assembly 90 may be provided.

For another example, the exchangeable position A2 of the cutter assembly 90 may not necessarily be located outward from the standby position A1 in the scanning direction Z as shown in FIG. 3 but may be, for example located at the same position as the standby position A1.

For another example, the controller board 55 and the communication board 56 may not necessarily be mounted on the same board but may be mounted on separate boards. In this arrangement, the controller board 55, the communication board 56, and the power supply board 59 may be located at vertically different positions, and the controller board 55, the communication board 56, and the power supply board 59 may be arranged to overlap one another at least partly in the top plan view.

For another example, the controlling flow for printing an image may not necessarily be limited to the flow shown in FIG. 7. For example, after conveying the sheet P in the second conveying direction D2 along the second conveyer path R2 in S4, the sheet P may be cut by the cutter assembly 90 in S8.

What is claimed is:

1. A printing apparatus, comprising:

a conveyer configured to convey a recording medium from a rear side toward a front side along a first conveying direction;

an image recorder having a supporting portion configured to support the recording medium conveyed by the conveyer, the image recorder being configured to record an image on the recording medium supported by the supporting portion;

a liquid storage arranged on an outside of the supporting portion in a direction intersecting with the first conveying direction, the liquid storage being configured to store liquid;

a cutter assembly configured to cut the recording medium on which the image is recorded; and a controller configured to:

move the cutter assembly to an outside of the supporting portion in a scanning direction, the scanning direction being a direction intersecting with the first conveying direction, the cutter assembly being configured to cut the recording medium by being moved to the outside of the supporting portion; and control the cutter assembly to stand by at a standby position located on a side of the supporting portion opposite to the side, on which the liquid storage is arranged, on the other outside of the supporting portion in the scanning direction, wherein the liquid storage is located frontward with respect to the standby position of the cutter assembly in the first conveying direction.

2. The printing apparatus according to claim 1, wherein the controller is configured to move the cutter assembly to an exchangeable position, in which the cutter assembly is exchangeable, the exchangeable position being located on the same side of the supporting portion in the scanning direction as the standby position.

3. The printing apparatus according to claim 2, wherein the exchangeable position is located outward with respect to the standby position in the scanning direction.

4. The printing apparatus according to claim 1, further comprising a driving assembly including a motor, the motor being configured to move the cutter assembly in the scanning direction, wherein the standby position and the driving assembly are located on the same side of the supporting portion in the scanning direction.

5. The printing apparatus according to claim 4, wherein the driving assembly includes a driving-force transmission configured to transmit a driving force from the motor to the cutter assembly, and the standby position and the driving-force transmission are located on the same side of the supporting portion in the scanning direction.

6. The printing apparatus according to claim 1, further comprising a position detector configured to detect a position of the cutter assembly being moved in the scanning direction, and wherein the standby position and the position detector are located on the same side of the supporting portion in the scanning direction.

7. The printing apparatus according to claim 1, wherein the conveyer includes a switchback roller being rotatable normally and reversely, the switchback roller being configured to convey the recording medium in a second conveying direction by rotating reversely, the second conveying direction being opposite to the first conveying direction, the printing apparatus comprises a driving assembly including a driving-force transmission configured to transmit a driving force from a motor to the switchback roller, and the standby position and the driving-force transmission are located on the same side of the supporting portion in the scanning direction.

8. The printing apparatus according to claim 1, further comprising a power supply board, wherein the standby position and the power supply board are located on the same side of the supporting portion in the scanning direction.

9. The printing apparatus according to claim 1, further comprising a communication board including an input/output interface, through which the printing apparatus communicates with an external device, wherein the standby position and the communication board are located on the same side of the supporting portion in the scanning direction.

10. The printing apparatus according to claim 1, further comprising a controller board, on which the controller is mounted, wherein the standby position and the controller board are located on the same side of the supporting portion in the scanning direction.

11. The printing apparatus according to claim 10, further comprising:

a power supply board; and a communication board including an input/output interface, through which the printing apparatus communicates with an external device, wherein the power supply board is located at a position different from the communication board and from the controller board in a direction of height of the printing apparatus, and wherein, in a top plan view of the printing apparatus, the power supply board at least partly overlaps the communication board and the controller board.

12. A printing apparatus, comprising:

a conveyer configured to convey a recording medium along a first conveying direction;

an image recorder having a supporting portion configured to support the recording medium conveyed by the conveyer, the image recorder being configured to record an image on the recording medium supported by the supporting portion;

a liquid storage arranged on an outside of the supporting portion in a direction intersecting with the first conveying direction, the liquid storage being configured to store liquid;

a cutter assembly configured to cut the recording medium on which the image is recorded; and a controller configured to:

move the cutter assembly to an outside of the supporting portion in a scanning direction, the scanning direction being a direction intersecting with the first conveying direction, the cutter assembly being configured to cut the recording medium by being moved to the outside of the supporting portion; and control the cutter assembly to stand by at a standby position located on a side of the supporting portion opposite to the side, on which the liquid storage is arranged, on the other outside of the supporting portion in the scanning direction; and a driving assembly including a motor, the motor being configured to move the cutter assembly in the scanning direction, wherein the standby position and the driving assembly are located on the same side of the supporting portion in the scanning direction.

13. A printing apparatus, comprising:

a conveyer configured to convey a recording medium along a first conveying direction;

an image recorder having a supporting portion configured to support the recording medium conveyed by the conveyer, the image recorder being configured to record an image on the recording medium supported by the supporting portion;

a liquid storage arranged on an outside of the supporting portion in a direction intersecting with the first conveying direction, the liquid storage being configured to store liquid;

a cutter assembly configured to cut the recording medium on which the image is recorded; and a controller configured to:

move the cutter assembly to an outside of the supporting portion in a scanning direction, the scanning direction being a direction intersecting with the first conveying direction, the cutter assembly being configured to cut the recording medium by being moved to the outside of the supporting portion; and control the cutter assembly to stand by at a standby position located on a side of the supporting portion opposite to the side, on which the liquid storage is arranged, on the other outside of the supporting portion in the scanning direction, wherein the conveyer includes a switchback roller being rotatable normally and reversely, the switchback roller being configured to convey the recording medium in a second conveying direction by rotating reversely, the second conveying direction being opposite to the first conveying direction, wherein the printing apparatus comprises a driving assembly including a driving-force transmission configured to transmit a driving force from a motor to the switchback roller, and the standby position and the driving-force transmission are located on the same side of the supporting portion in the scanning direction.

* * * * *